(12) United States Patent
Cho et al.

(10) Patent No.: US 8,830,924 B2
(45) Date of Patent: Sep. 9, 2014

(54) METHOD FOR REQUESTING BANDWIDTH BY MESSAGE HAVING VARIABLE FORMAT

(75) Inventors: Hee Jeong Cho, Anyang-si (KR); Ki Seon Ryu, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 258 days.

(21) Appl. No.: 13/003,591

(22) PCT Filed: Jun. 25, 2009

(86) PCT No.: PCT/KR2009/003441
§ 371 (c)(1),
(2), (4) Date: Jan. 11, 2011

(87) PCT Pub. No.: WO2010/008146
PCT Pub. Date: Jan. 21, 2010

(65) Prior Publication Data
US 2011/0103342 A1    May 5, 2011

Related U.S. Application Data

(60) Provisional application No. 61/080,695, filed on Jul. 15, 2008.

(30) Foreign Application Priority Data

Sep. 4, 2008 (KR) ........................ 10-2008-0087289
Nov. 12, 2008 (KR) ........................ 10-2008-0111987
Dec. 5, 2008 (KR) ........................ 10-2008-0123006

(51) Int. Cl.
*H04W 4/00* (2009.01)

(52) U.S. Cl.
USPC ........... 370/329; 370/335; 370/346; 370/342; 370/347; 370/350; 370/445; 370/256; 370/428

(58) Field of Classification Search
None
See application file for complete search history.

(56) References Cited

U.S. PATENT DOCUMENTS

2005/0063330 A1*  3/2005  Lee et al. ...................... 370/328
2005/0195791 A1*  9/2005  Sung et al. .................... 370/342
(Continued)

FOREIGN PATENT DOCUMENTS

| EP | 1912390 A1 | 4/2008 |
| EP | 1940185 A1 | 7/2008 |
| JP | 2008-99282 A | 4/2008 |
| KR | 10-2005-0089700 A | 9/2005 |

(Continued)

OTHER PUBLICATIONS

Cho et al., "Bandwidth Request Schemes using QoS ID," IEEE, Document No. IEEE C802.16-09/0293, Jan. 7, 2009, pp. 1-10.

(Continued)

*Primary Examiner* — Ian N Moore
*Assistant Examiner* — Eric H Wang
(74) *Attorney, Agent, or Firm* — Birch, Stewart, Kolasch & Birch, LLP

(57) ABSTRACT

A method for requesting a bandwidth by a message having a variable format is disclosed. The method includes determining a bandwidth request type according to a size of an uplink bandwidth requested by a mobile station, generating a bandwidth request message having a header format according to the determined bandwidth request type, and transmitting the bandwidth request message to a base station. The determined bandwidth request type is one of a bandwidth request per connection, a bandwidth request per Quality of Service (QoS), and a bandwidth request per mobile station.

4 Claims, 12 Drawing Sheets

(56) References Cited

U.S. PATENT DOCUMENTS

| | | | |
|---|---|---|---|
| 2006/0031924 A1* | 2/2006 | Kwon et al. | 726/2 |
| 2006/0227747 A1 | 10/2006 | Kim et al. | |
| 2007/0178880 A1 | 8/2007 | Saito et al. | |
| 2007/0201399 A1 | 8/2007 | Lee et al. | |
| 2007/0206561 A1* | 9/2007 | Son et al. | 370/346 |
| 2007/0223491 A1 | 9/2007 | Baek et al. | |
| 2008/0090585 A1 | 4/2008 | Hart et al. | |
| 2010/0046400 A1* | 2/2010 | Wu et al. | 370/256 |

FOREIGN PATENT DOCUMENTS

| | | |
|---|---|---|
| KR | 10-2007-0021726 A | 2/2007 |
| KR | 10-0941052 B1 | 1/2008 |
| KR | 10-2008-0104518 A | 12/2008 |
| KR | 10-2009-0094591 A | 9/2009 |

OTHER PUBLICATIONS

Zheng et al., "BR ranging code in 802.16m," IEEE, Document No. IEEE C802.16m-08/829, Jul. 11, 2008, 12 pages total.

* cited by examiner

FIG. 5

| ... | Header type | BR size | ID (CID or flow ID) | ... |

FIG. 6

| ... | Header type | BR size | QoS level | ... |

FIG. 7

| ... | Header type | BR size | ID (CID or MSID/ station ID or Logical ID) | QoS level | ... |

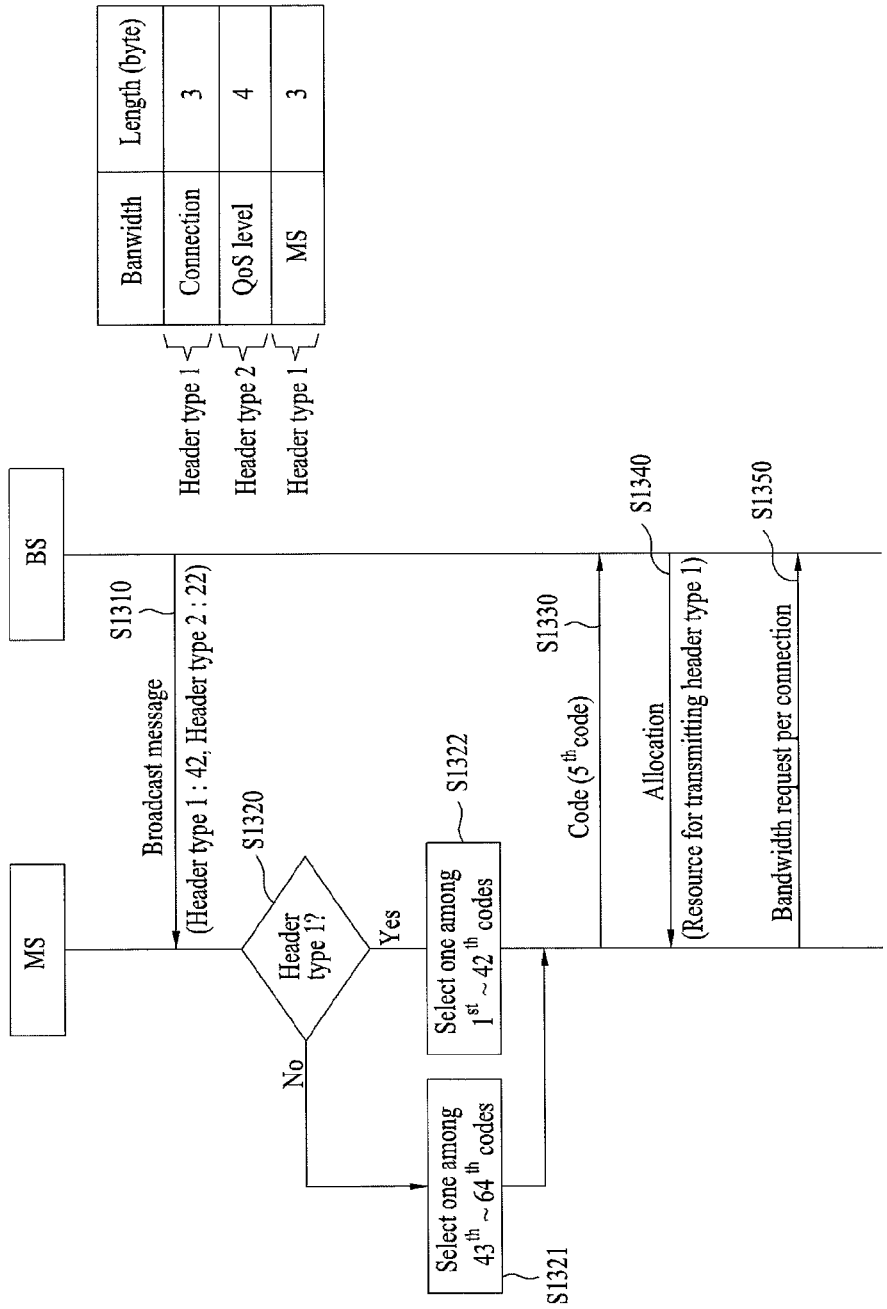

METHOD FOR REQUESTING BANDWIDTH BY MESSAGE HAVING VARIABLE FORMAT

This application is the National Phase of PCT/KR2009/003441 filed on Jun. 25, 2009, which claims priority under 35 U.S.C. 119(e) to U.S. Provisional Application No. 61/080,695 filed on Jul. 15, 2008 and KR Patent Application Nos. 10-2008-0087289, filed Sep. 4, 2008, KR 10-2008-0111987 filed on Nov. 12, 2008 and KR 10-2008-0123006 filed on Dec. 5, 2008, all of which are hereby expressly incorporated by reference into the present application.

TECHNICAL FIELD

The present invention relates to uplink resource allocation, and more particularly, to a method for efficiently transmitting allocation request information from a Mobile Station (MS) to a Base Station (BS).

BACKGROUND ART

In a conventional broadband wireless access system, an MS may request an uplink bandwidth by transmitting a Bandwidth Request (BR) to a BS in a Medium Access Control (MAC) signaling header or a MAC subheader. The uplink BR is made per connection between the MS and the BS.

A conventional BR header has the format illustrated in FIG. 1. The MS may request an uplink bandwidth of up to 512 KB using this BR header.

Table 1 below lists fields of the conventional BR header illustrated in FIG. 1.

TABLE 1

| Name | Length (bit) | Description |
|---|---|---|
| BR | 19 | Bandwidth request. The number of bytes of UL bandwidth requested by the Subscriber Station (SS). The BR is for the CID. The request shall not include any PHY overhead. |
| CID | 16 | Connection identifier. |
| EC | 1 | Always set to zero |
| HCS | 8 | Header check sequence. |
| HT | 1 | Header type = 1. |
| Type | 3 | Indicates the type of BRIGHTNESS header. |

A MAC signaling header that carries a BR along with an Uplink Transmit (UL Tx) power report is formatted as illustrated in FIG. 2.

Table 2 describes fields of the MAC signaling header illustrated in FIG. 2. The MS may request an uplink bandwidth of up to 2 KB by this MAC signaling header.

TABLE 2

| Name | Length (bit) | Description |
|---|---|---|
| Type | 3 | The type of BR and UL Tx power report header. |
| BR | 11 | Bandwidth request. The number of bytes of UL bandwidth requested by the MS. The BR is for the CID. The request shall not include any PHY overhead. It is incremental BR. In case of the Extended rtPS, the BS changes its polling size into the value specified in this field. |
| UL Tx power | 8 | UL Tx power level in dBm for the burst that carries this header. The value shall be estimated and reported for the burst. |

TABLE 2-continued

| Name | Length (bit) | Description |
|---|---|---|
| CID | 16 | The connection identifier that shall indicate the connection for which UL bandwidth is requested. |
| HCS | 8 | Header check sequence. |

Besides the above two headers, a Bandwidth Request/Carrier to Interference and Noise Ratio (BR/CINR) report header and a BR with UL sleep control header are available for requesting an uplink bandwidth. The MS may request an uplink bandwidth of up to 2 KB by the BR/CINR report header or the BR with UL sleep control header.

Because the MS requests an uplink bandwidth on a connection basis in the conventional broadband wireless access system, the BR always includes a 16-bit Connection Identifier (CID). Bits required to express the maximum requested bandwidth size 512 KB or 2 KB are simply included in each BR header. Therefore, the conventional bandwidth request method may not prevent the increase of unnecessary overhead.

DISCLOSURE

Technical Problem

An object of the present invention devised to solve the problem lies on a method for requesting a bandwidth in a message having a variable format by more efficiently designing the format of a BR header or subheader in order to reduce BR overhead.

It will be appreciated by persons skilled in the art that the present invention is not limited to what has been particularly described hereinabove. Other technical problems that are not described herein will be apparent from the following description to persons skilled in the art.

Technical Solution

The object of the present invention can be achieved by providing a method for requesting a bandwidth by a message having a variable format is disclosed, the method including determining a bandwidth request type according to a size of an uplink bandwidth requested by a mobile station, generating a bandwidth request message having a header format according to the determined bandwidth request type, and transmitting the bandwidth request message to a base station. The determined bandwidth request type is one of a bandwidth request per connection, a bandwidth request per QoS, and a bandwidth request per mobile station.

The bandwidth request type determination may include selecting the bandwidth request per connection that requests a bandwidth on a CID-for-CID basis, if the size of the requested uplink bandwidth is equal to or less than a first threshold.

The bandwidth request type determination may include selecting the bandwidth request per QoS that requests a bandwidth for CIDs having the same QoS level, if the size of the requested uplink bandwidth is larger than a first threshold and equal to or less than a second threshold.

The bandwidth request type determination may include selecting the bandwidth request per mobile station, if the size of the requested uplink bandwidth is larger than a second threshold.

The bandwidth request message generation may include adding a QoS level field including QoS level information according to parameters set for logical connections to the base station to the bandwidth request message, if the bandwidth request per Qos is selected. The QoS level field may include at least one of a grant scheduling type, a maximum latency, a minimum reserved traffic rate, and a priority.

In another aspect of the present invention, provided herein is a method for requesting a bandwidth by a message having a variable format, the method including receiving information about mapping between random access codes and header types from a base station, determining a bandwidth request type according to a size of an uplink bandwidth requested by a mobile station, selecting a random access code mapped to a header type corresponding to the determined bandwidth request type, transmitting the selected random access code to the base station, generating a bandwidth request message having a header format corresponding to the determined bandwidth request type, and transmitting the bandwidth request message. The determined bandwidth request type is one of a bandwidth request per connection, a bandwidth request per QoS, and a bandwidth request per mobile station.

The bandwidth request type determination may include selecting the bandwidth request per QoS that requests a bandwidth for CIDs having the same QoS level, if the size of the requested uplink bandwidth is larger than a first threshold and equal to or less than a second threshold.

The bandwidth request type determination may include selecting the bandwidth request per mobile station, if the size of the requested uplink bandwidth is larger than a second threshold.

The bandwidth request message generation may include adding a QoS level field including QoS level information according to parameters set for logical connections to the base station to the bandwidth request message, if the bandwidth request per Qos is selected.

The header type is information indicating a classification of the bandwidth request type determined according to a header length thereof.

Advantageous Effects

Exemplary embodiments of the present invention have the following effects.

First of all, a different BR message format is used for a different BR type. Hence, a BR message optimized for a bandwidth request type is transmitted, thereby reducing overhead.

Another effect is that radio resources are efficiently used due to the decrease of BR overhead.

It will be appreciated by persons skilled in the art that the present invention is not limited to what has been particularly described hereinabove. Other effects that are not described herein will be apparent from the following description to persons skilled in the art.

DESCRIPTION OF DRAWINGS

The accompanying drawings, which are included to provide a further understanding of the invention, illustrate embodiments of the invention and together with the description serve to explain the principle of the invention.

In the drawings:

FIGS. 5, 6 and 7 illustrate exemplary header formats for different BR types.

FIG. 13 illustrates a method for notifying the length of a BR according to another exemplary embodiment of the present invention.

BEST MODE

Figure 1:
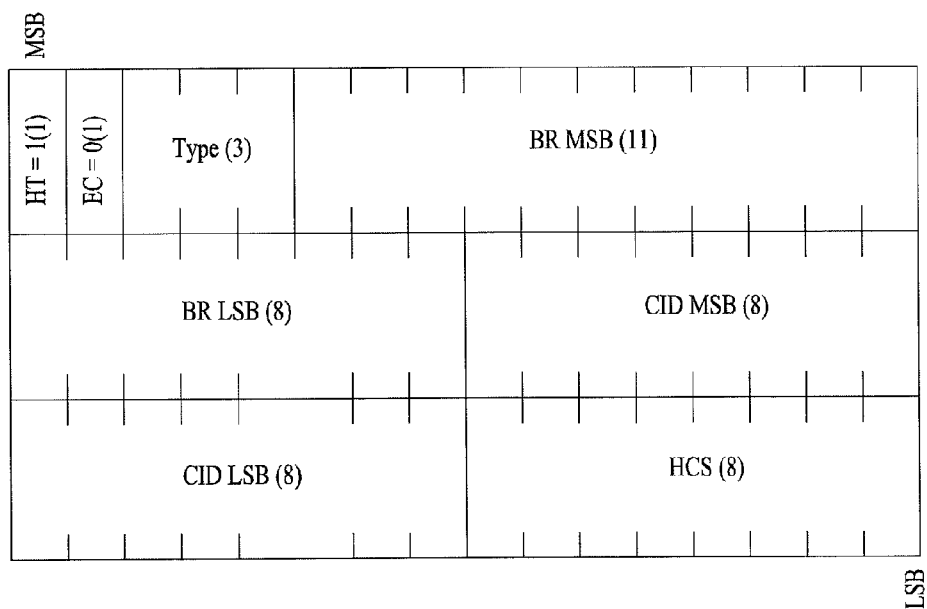
FIG. 1 illustrates an exemplary format of a conventional BR header.
Figure 2:
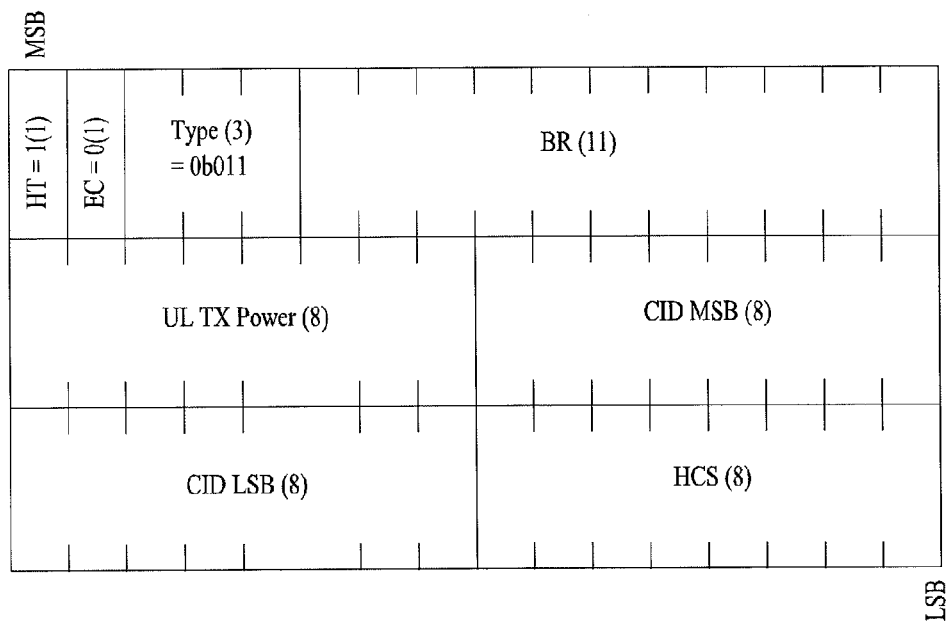
FIG. 2 illustrates an exemplary format of a MAC signaling header that carries a BR along with a UL Tx power report.

The present invention relates to a wireless access system. Exemplary embodiments of the present invention provide methods for efficiently transmitting resource allocation request information to a Base Station (BS).

The exemplary embodiments described hereinabove are combinations of elements and features of the present invention. The elements or features may be considered selective unless otherwise mentioned. Each element or feature may be practiced without being combined with other elements or features. Further, the embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment.

In the description of the drawings, procedures or steps that would make the subject matter of the present invention obscure are not described and procedures or steps that could be understood to those skilled in the art are not described either.

In the exemplary embodiments of the present invention, a description is mainly made of a data transmission and reception relationship between a BS and an MS. The term "BS" indicates a terminal node of a network that directly communicates with an MS. Here, a specific operation described as being performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with a fixed station, a Node B, an eNode B (eNB), an access point, etc. The term 'MS' may be replaced with a User Equipment (UE), a Subscriber Station (SS), a Mobile Subscriber Station (MSS), a mobile terminal, a terminal, etc.

A transmitter refers to a fixed and/or mobile node that provides data service or voice service, and a receiver refers to a fixed and/or mobile node that receives data service or voice service. Hence, an MS may act as a transmitter and a BS may act as a receiver, on the uplink, whereas the MS may act as a receiver and the BS may act as a transmitter, on the downlink.

Herein, an MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc. Also, the MS may be any of a hand-held PC, a laptop computer, a smart phone, a MultiMode-MultiBand (MM-MB) terminal, etc.

The smart phone refers to a terminal taking the advantages of a mobile terminal and a personal portable terminal. It integrates data communication functions of the personal portable terminal, inclusive of schedule management, fax transmission and reception, Internet connection, etc. into the mobile terminal. The MM-MB terminal is a terminal that has an in-built modem chip and is capable of operating in a portable Internet system and other communication systems (e.g. CDMA 2000, WCDMA, etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. A software code may be stored in a memory unit and driven by a processor. The memory unit is located at the interior or exterior of the processor and may transmit data to and receive data from the processor via various known means.

The exemplary embodiments of the present invention may be supported by standard documents disclosed for at least one of the standards of Institute of Electrical and Electronics Engineers (IEEE 802), $3^{rd}$ Generation Partnership Project (3GPP), $3^{rd}$ Generation Partnership Project Long Term Evolution (3GPP LTE), and $3^{rd}$ Generation Partnership Project 2 (3GPP2). That is, in the exemplary embodiments of the present invention, steps or parts that are not described to clarify the technological spirit of the present invention may be supported. All terms used herein may be described in the standard documents. Especially, the exemplary embodiments of the present invention may be supported by one or more of IEEE 802.16 standard documents, that is, P802.16-2004, P802.16e-2005, and P802.16Rev2.

Reference will now be made in detail to the preferred embodiments of the present invention, examples of which are illustrated in the accompanying drawings. It should not be construed that they are the only embodiments of the present invention.

Specific terms used herein are provided to help understanding of the present invention. The terms may be replaced with other terms within the scope and spirit of the present invention.

A maximum requested bandwidth size is different according to a BR type. Accordingly, limiting a BR message to a single format may increase header overhead.

In accordance with exemplary embodiments of the present invention, a BR per QoS (QoS-based BR), a BR per control signaling (control signaling-based BR), and a BR per MS (MS-based BR) as well as a BR per connection (connection-based BR) are considered in designing BR formats in a new wireless access system. Thus, an MS may transmit the BR information more efficiently.

The first consideration, BR types may be classified as follows.

In the case of connection-based uplink allocation, the MS requests resource allocation on a connection basis to the BS. The BS allocates resources to the MS, taking into account all information associated with a connection to the MS (e.g. QoS level parameters, etc.). The MS uses the connection-based allocated resources for data transmission via the connection.

In QoS level-based uplink allocation, the MS requests resources for connections with the same or similar QoS levels. For example, if there are CID 1 and CID 3 for real-time Polling Service (rtPS) and CID 2 for Best Effort (BE) service as grant scheduling types, the MS may request resource allocation for CID 1 and CID 3 of the same grant scheduling type by one message. The BS may allocate uplink resources using other information associated with the connections of the QoS level or taking into account only information received from the MS when the MS requests the resource allocation. In the above example, if the BS allocates resources to the MS for the rtPS, the MS divides the allocated resources for CID 1 and CID 3.

Finally, in the case of MS-based uplink allocation, resources are allocated on an MS-by-MS basis for all connections. The BS may allocate uplink resources to the MS using all information associated with all the connections between the BS and the MS, or taking into account only information received from the MS when the MS requests the resource allocation. When the BS allocates resources to the MS on an MS basis, the MS divides the allocated resources freely.

Figure 3A:
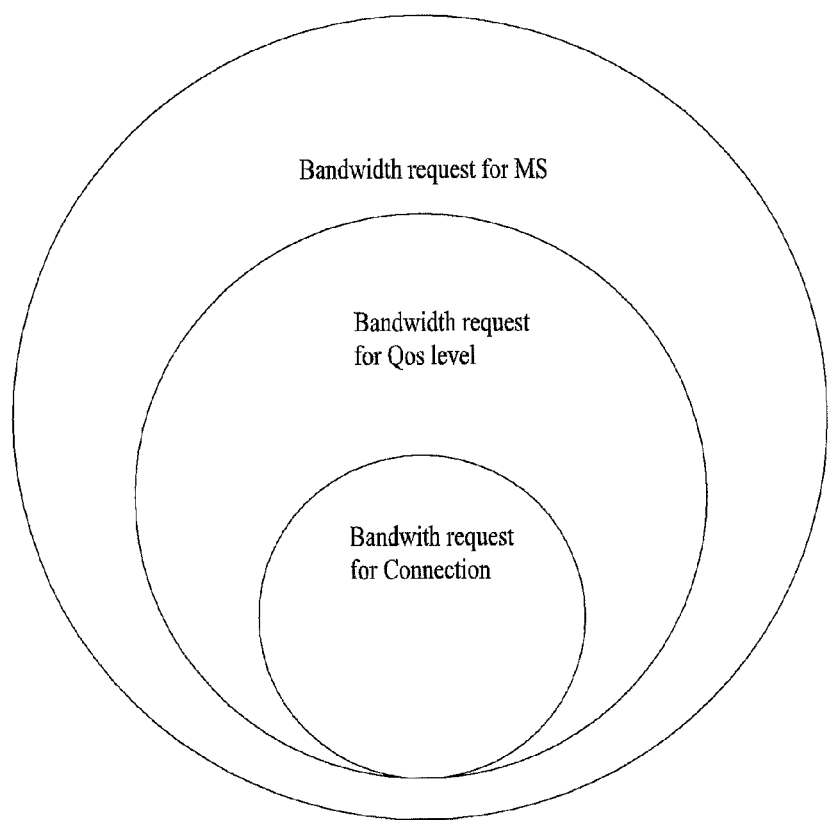
FIG. 3A illustrates a relationship among BR types according to an exemplary embodiment of the present invention.

FIG. 3A illustrates a relationship among BR types according to an exemplary embodiment of the present invention.

An upper BR type covers lower bandwidth request types in its range of requesting uplink resources. Thus, different BR formats may be designed for these BR types. Also, a maximum requested bandwidth size may differ for each BR type.

A QoS level for a flow may be represented by QoS level parameters (fields) of the flow. A QoS level field may have parameters including Scheduling type, Maximum latency, Traffic rate, Priority, etc. Scheduling type may distinguish control data from traffic data. The control data includes signaling, a MAC message, etc. and the traffic data includes Unsolicited Grant Service (UGS) data, rtPS data, Extended real time Polling Service (ertPS) data, non-real time Polling Service (nrtPS) data, and BE data. Maximum latency is a parameter required for delay-sensitive data. Traffic rate includes Maximum sustained traffic rate, Minimum reserved traffic rate, etc. When flows having the same QoS level have the same values in other parameters, they are prioritized from the Priority parameter. Priority may be determined according to QoS parameters (e.g. Maximum latency, Traffic rate, etc.) that are not included for the corresponding QoS level.

A QoS index indicates a QoS level represented by the QoS level field. Predetermined QoS levels may be labeled with indexes in order to determine QoS indexes.

An example of indexing QoS levels according to Scheduling type and Priority is given in Table 3.

TABLE 3

| QoS index | Scheduling type | Priority |
|---|---|---|
| 1 | Control signaling | 0 |
| 2 | rtPS | 0 |
| 3 | rtPS | 1 |
| ... | ... | ... |
| 10 | nrtPS | 0 |
| 11 | nrtPS | 1 |
| 12 | BE | 0 |

The above listed QoS indexes may be determined by the MS or the BS.

Figure 3B:
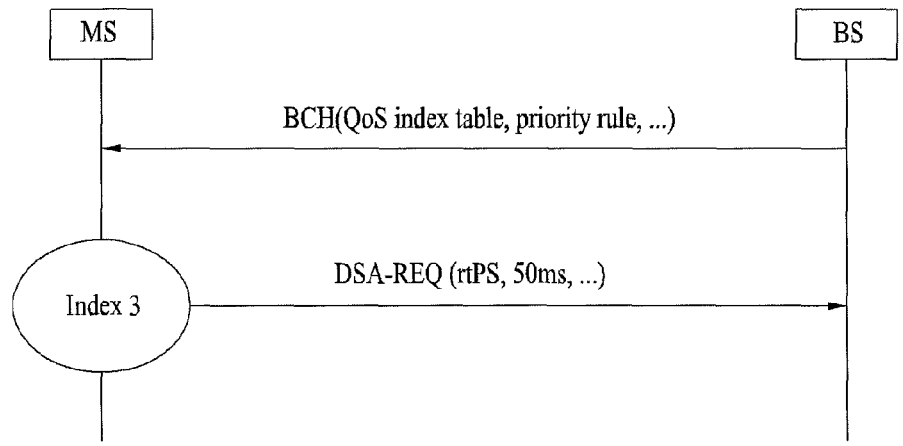
FIG. 3B is a diagram illustrating an exemplary operation for determining a Quality of Service (QoS) index in an MS.

FIG. 3B is a diagram illustrating an exemplary operation for determining a QoS index in the MS.

Referring to FIG. 3B, the BS transmits a QoS index table, priority rule information, etc. to MSs on a broadcast channel or by a MAC message. For example, the priority rule information may regulate that priority 0 is for a latency of 49 ms or below and priority 1 is for a latency of 50 ms or above.

Each MS determines the QoS index of a flow based on the information received from the BS.

The MS may transmit the determined QoS index by a Dynamic Service Addition-REQuest (DSA-REQ) message. In the illustrated case of FIG. 3B, the MS decides on Index 3 of Table 3.

Figure 3C:
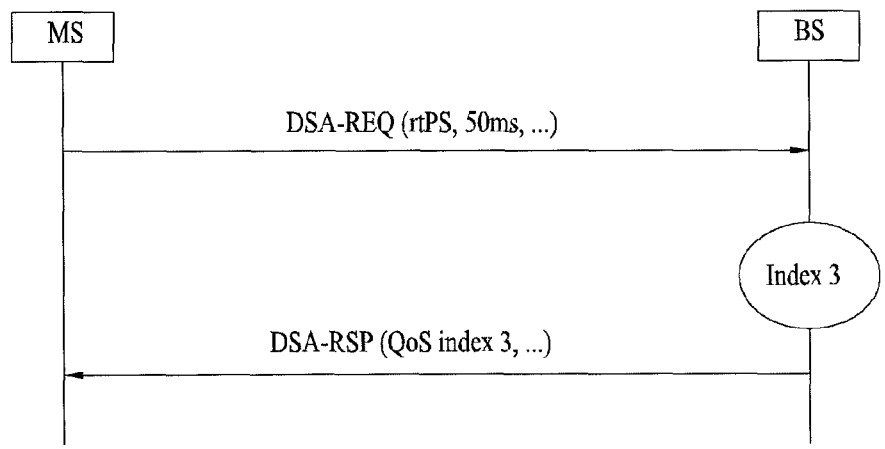
FIG. 3C is a diagram illustrating an exemplary operation for determining a QoS index in a BS.

FIG. 3C is a diagram illustrating an exemplary operation for determining a QoS index in the BS.

Referring to FIG. 3C, each MS transmits QoS level parameters for a new flow to the BS by a DSA-REQ message.

The BS determines a QoS index for the flow based on the QoS level parameters received from the MS. In the illustrated case of FIG. 3C, the BS decides on Index 3 of Table 3.

The BS transmits the determined QoS index to the MS by a Dynamic Service Addition-ReSPonse (DSA-RSP) message. Along with the QoS index, priority rule information may also be transmitted. If the BS creates a new flow, it may determine a QoS index for the new flow and transmit the QoS index to the MS by a DSA-REQ message. If QoS level parameters of the flow are changed, the determined/transmitted QoS index may be changed by exchanging MAC messages (e.g. Dynamic Service Change-REQ (DSC-REQ)/DSC-RSP) between the MS and the BS.

A description will now be made of an example of a priority rule. As stated before, the priority rule applies to prioritize flows with the same QoS level when the flows have the same values in other parameters of the QoS level field.

In case of delay-sensitive data, for example, control signaling like a MAC message or traffic such as UGS, rtPS, ertPS, etc., the delay-sensitive data is prioritized according to a delay-related parameter (e.g. Maximum Latency) of its flow.

In case of delay-tolerant data, for example, traffic such as nrtPS or BE, a lowest priority level may be given to the delay-tolerant data. For example, QoS Index 11 illustrated in Table 3 may be allocated to nrtPS. The MS may change the lowest priority level of the flow of the nrtPS according to traffic rate-related parameters (e.g. maximum sustained traffic rate and minimum reserved traffic rate) and a queuing delay value. Accordingly, the QoS index of the flow may be changed.

Figure 3D:
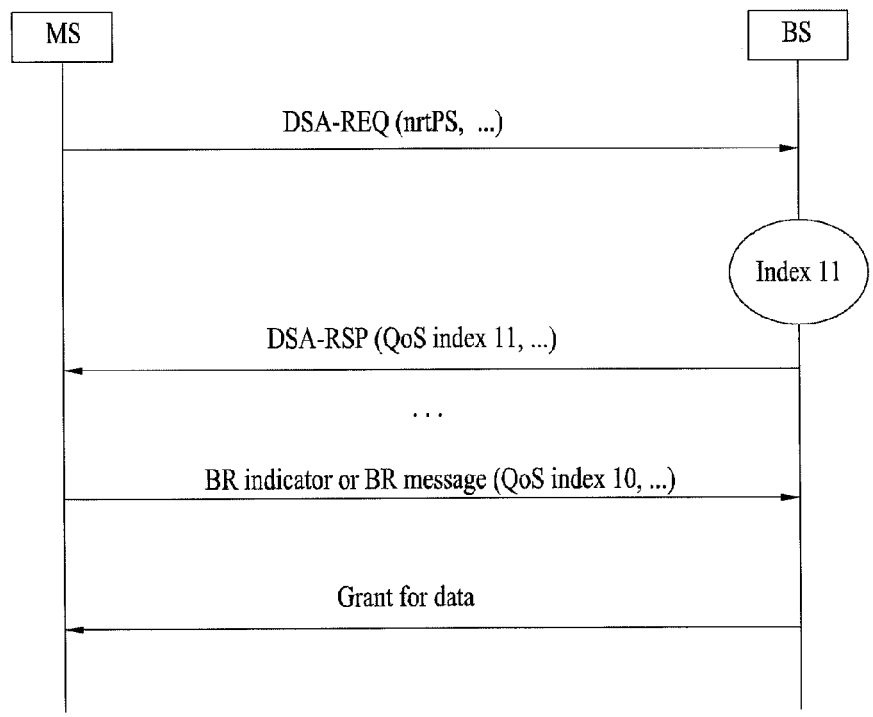
FIG. 3D is a diagram illustrating an exemplary operation for changing the QoS index of delay-tolerant data.

FIG. 3D is a diagram illustrating an exemplary operation for changing the QoS index of delay-tolerant data.

Referring to FIG. 3D, the MS transmits QoS level parameters to the BS by a DSA-REQ message.

The BS determines a QoS index based on the QoS level parameters. In the illustrated case of FIG. 3D, the BS decides on Index 11 of Table 3.

When the MS transmits a changed QoS index (e.g. QoS Index 10) to the BS by a BR indicator or BR message, the BS allocates resources to the MS according to the changed QoS index.

A scheduler used in the system illustrated in FIG. 3D may schedule, taking into account a QoS index as well as elements including the channel status of the MS, the amount of previous transmission data. etc. Different priority levels may be given to delay-tolerant data. For instance, the delay-tolerant data may be prioritized according to the time points of BRs being queued for them.

Figure 4:
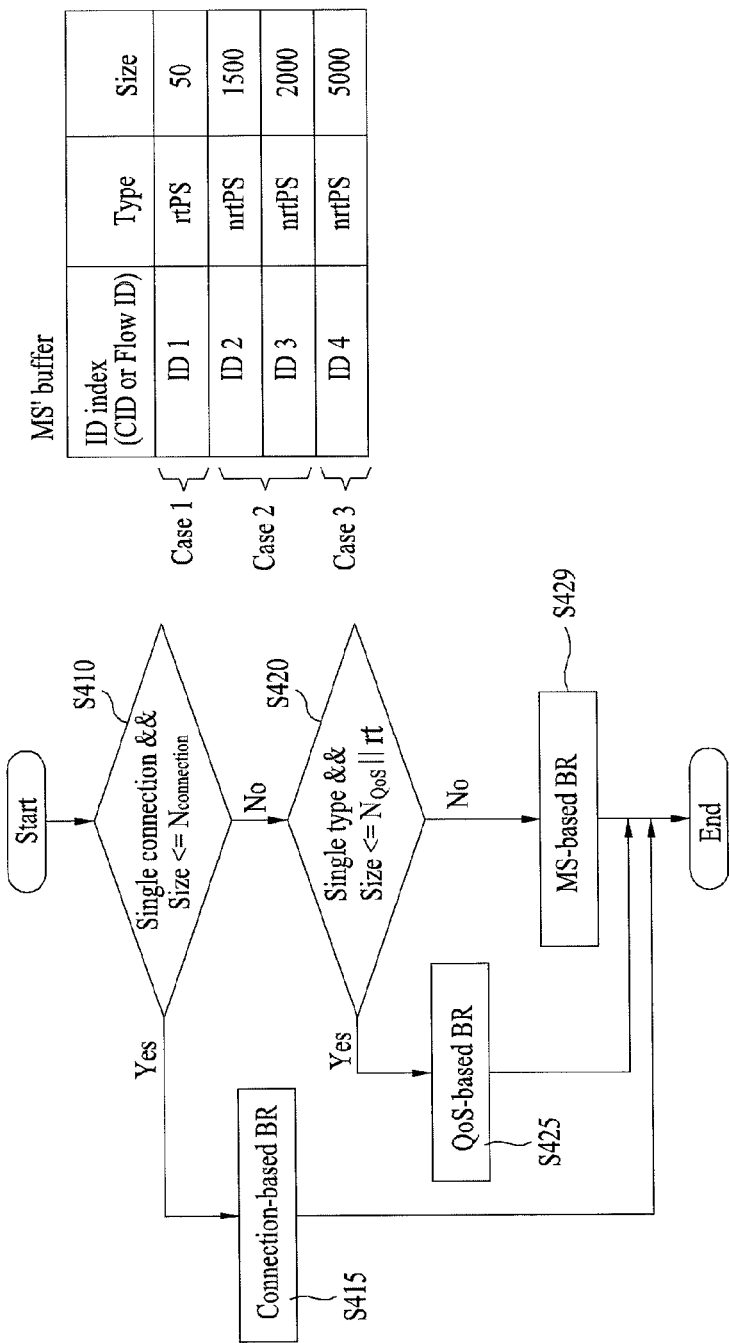
FIG. 4 is a flowchart illustrating an operation for determining a BR type according to the size of a requested uplink bandwidth according to an exemplary embodiment of the present invention.

FIG. 4 is a flowchart illustrating a procedure for determining a BR type according to a requested uplink bandwidth size according to an exemplary embodiment of the present invention.

$N_{connection}$ denotes a maximum uplink bandwidth size that can be requested by a connection-based BR. $N_{QoS}$ denotes a maximum uplink bandwidth size that can be requested by a Qos-based BR. $N_{MS}$ denotes a maximum uplink bandwidth size that can be requested by an MS-based BR. Herein, $N_{connection} < N_{QoS} <= N_{MS}$.

Referring to FIG. 4, if the MS wants to request an uplink bandwidth for a single connection with a CID or flow ID and the requested bandwidth is equal to or less than $N_{connection}$ in step S410, it selects a connection-based BR in step S415.

If the MS wants to request an uplink bandwidth for connections with CIDs or flow IDs and the requested bandwidth is larger than $N_{connection}$ and less than $N_{QoS}$ in step S420, it selects a Qos-based BR in step S425. Also, when an uplink bandwidth is requested for a connection for a real-time service, the MS selects the Qos-based BR in step S425.

In any other case, the MS selects an MS-based BR in step S429.

Assuming that $N_{connection}$ is 2K, $N_{QoS}$ is 32K, and $N_{MS}$ is 500K, the MS transmits a BR in the connection-based BR format in Case 1 since the requested bandwidth is less than $N_{connection}$ (2K). In Case 2, the requested bandwidth is larger than $N_{connection}$ (2K) and less than $N_{QoS}$ (32K), the MS transmits a BR in the QoS-based BR format. In Case 3, the requested bandwidth is large in spite of a single connection. Hence, the MS transmits a BR in the QoS-based BR format and uses all of allocated resources for CID 4.

A BR transmitted in a MAC signaling header may be formatted to include different fields according to its BR type. Header Type indicating the type of contents in the header and BR Size indicating the amount of requested uplink resources are common to BRs irrespective of their types. The lengths of the BR Size field for the BR types satisfy the condition that $L_{connection} < L_{QoS} <= l L_{MS}$.

FIGS. 5, 6 and 7 illustrate exemplary header formats for different BR types.

The MS may design a BR header flexibly by adding a QoS level field of a different length or a QoS index indicating a level represented by the QoS level field according to an uplink grant scheduling type. Message overhead may be reduced by replacing the QoS level field with the QoS index. The BS identifies a BR type from Header Type or any other field (e.g. an ID field).

FIG. 5 illustrates an exemplary format of a MAC signaling header for a connection-based BR.

When the MS transmits the ID of a logical connection between the MS and the BS (CID in IEEE 802.16e system and flow ID in IEEE 802.16m system) in a connection-based BR, the BS may allocate uplink resources for the ID based on parameters set for the ID.

FIG. 6 illustrates an exemplary format of a MAC signaling header for a QoS-based BR.

When the MS transmits to the BS a QoS level field representing a QoS level by parameters set for logical connections between the MS and the BS according to a predetermined criterion or a QoS index indicating the QoS level represented by the QoS level field, the BS allocates uplink resources to the MS based on the QoS level. The MS distributes the allocated resources in appropriate sizes to services with the QoS level. The distribution of the allocated resources to the connections having the QoS level leads to the same result from the connection-based BR.

FIG. 7 illustrates an exemplary format of a MAC signaling header for an MS-based BR.

The BS may determine a QoS level (or a service) for which an MS are to allocate uplink resources with priority, from a QoS level field in the MAC signaling header. Also, the BS may determine which BR to be accepted for resource allocation among a plurality of BRs, according to the QoS levels set in the QoS level fields of the BRs.

The afore-described BRs may be transmitted in a MAC signaling subheader, instead of a MAC signaling header. Transmission of a BR in a MAC subheader means that the BR is added to a generic MAC header of uplink data including a MAC message, for transmission.

Figure 8:
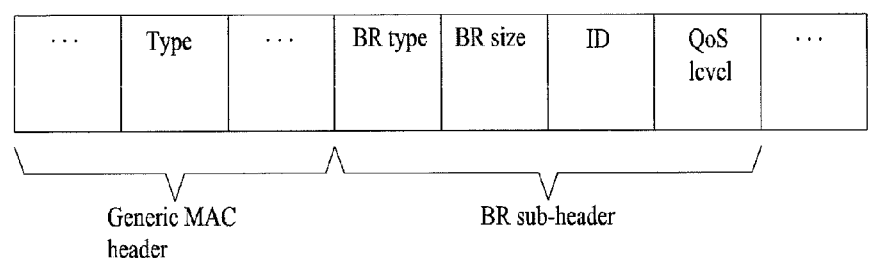
FIGS. 8 and 9 illustrate exemplary formats of a MAC subheader for a BR.
Figure 9:
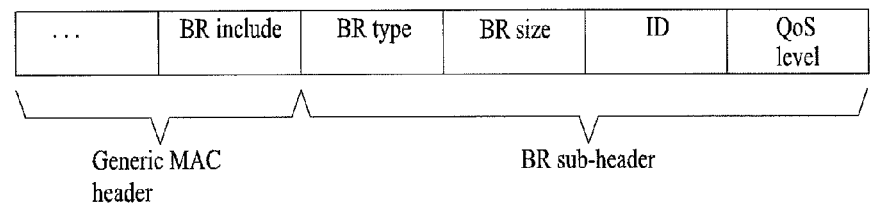

FIGS. 8 and 9 illustrate exemplary formats of a MAC subheader for a BR.

The header format illustrated in FIG. 8 indicates whether a BR subheader is included or not by Type field in a generic MAC header. For example, if the Type field is set to '001', this implies that the BR subheader is included. The BR subheader includes BR type identifying the type of the BR, BR size indicating the size of a requested bandwidth, ID (MS ID or Station ID), and QoS level representing a QoS level.

Referring to FIG. 9, the presence or absence of a BR subheader in the MAC signaling header is indicated by a 1-bit BR include field. For example, if BR include is set to '0', this means that the BR subheader is not included. If BR include is set to '1', this means that the BR subheader is included.

FIGS. 8 and 9 illustrate BR subheaders, to which the present invention is not limited. The present invention is applicable to a subheader of any other type or an extended header.

Some fields of the BR subheaders illustrated in FIGS. 8 and 9 are optional and may not be transmitted according to BR types.

Meanwhile, the number of bits of the QoS level field or the QoS index indicating a QoS level represented by the QoS level field may be determined according to QoS level parameters included in the QoS level field. The BS may transmit information about the number of bits by a broadcast message (e.g. Uplink Channel Descriptor (UCD), sub-UCD, HRG, MRG or LRG) or on a broadcast channel (e.g. Primary Broadcast CHannel (PBCH), Secondary Broadcast CHannel (SBCH), Primary-SuperFrame Header (P-SFH), or Secondary-SuperFrame Header (S-SFH)). The bit number information may be transmitted by a MAC message (e.g. RaNGing ReSPonse (RNG-RSP), REGistration ReSPonse (REG-RSP), or SS Basic Capability ReSPonse (SBC-RSP)) during initial entry, or by a MAC message (e.g. DSA-RSP or DSC-RSP) during a dynamic service. Or the bit number information may be pre-stored in the MS.

As described above, a QoS level is notified by the QoS level field including a plurality of elements associated with the QoS level or a QoS index indicating the QoS level. In the case of the QoS index, the parameters of the QoS level field are not transmitted.

Figure 10:
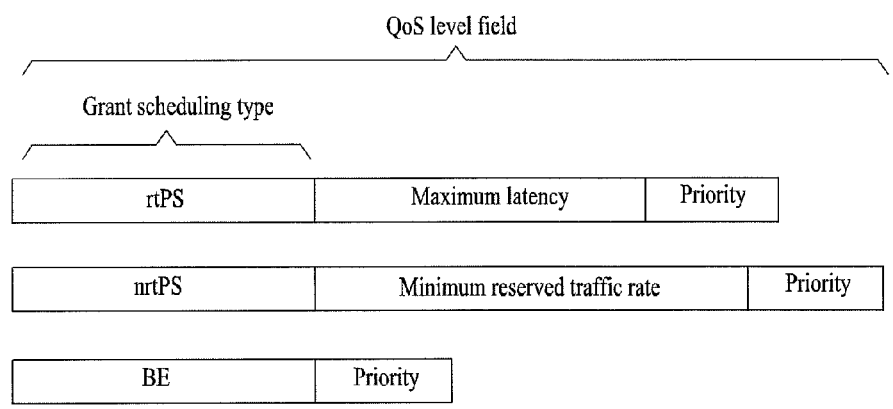
FIG. 10 illustrates exemplary elements of a QoS level field according to grant scheduling types.

FIG. 10 illustrates an exemplary notification of a QoS level by a QoS level field, not by a QoS index.

Referring to FIG. 10, the QoS level field includes Grant scheduling type. For example, UL grant scheduling type may occupy 2 bits. If UL grant scheduling type indicates rtPS, the MS adds Maximum latency to the QoS level field. If UL grant scheduling type indicates nrtPS, the MS adds Traffic rate to the QoS level field because Traffic rate may be significant information to nrtPS. Also, the MS may add Priority indicating the priority level of a BR to the QoS level field.

Figure 11:
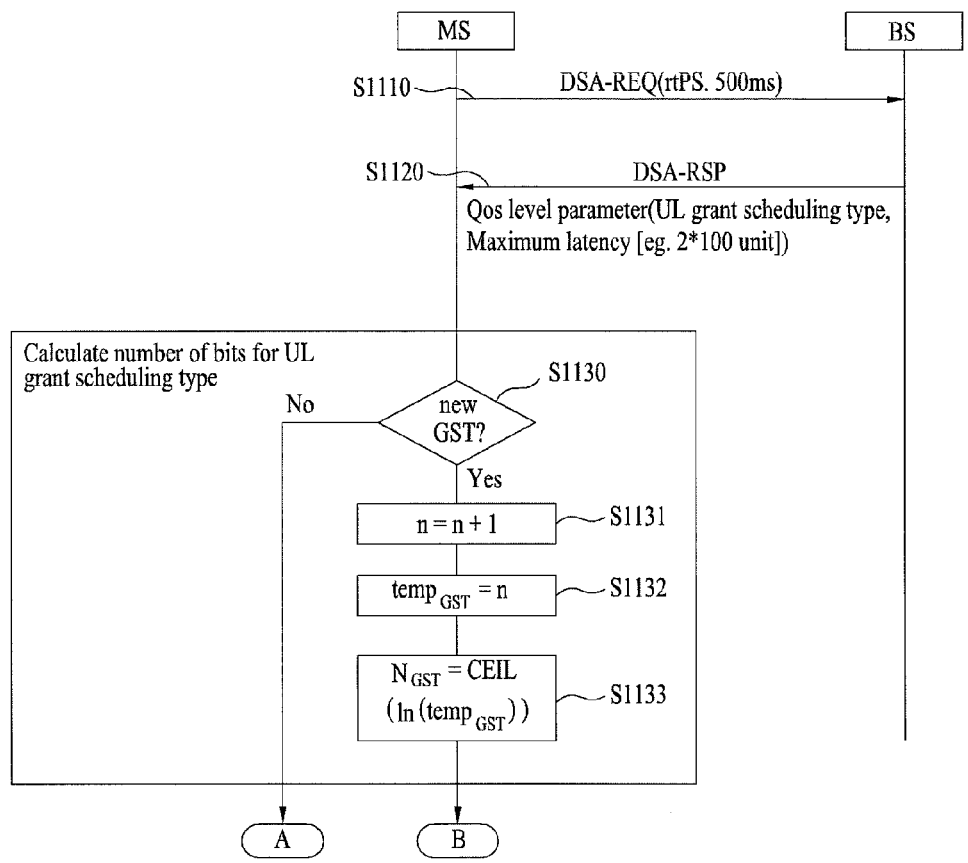
FIG. 11 is a flowchart illustrating an operation for calculating the number of bits required for UL grant scheduling type being an element of the QoS level field.

FIG. 11 is a flowchart illustrating an operation for calculating the number of bits required for UL grant scheduling type being an element of the QoS level field, illustrated in FIG. 10.

Referring to FIG. 11, the MS transmits a DSA-REQ message to the BS in step S1110. Upon receipt of elements of a QoS level field (i.e. QoS level parameters) from the BS in step S1120, the MS determines whether UL grant scheduling type indicates a new uplink grant scheduling type in step S1130.

If UL grant scheduling type indicates a new uplink grant scheduling type, which means that the new uplink scheduling type is added to the scheduling types (n scheduling types) of existing connections to the BS, the number of the current scheduling types is (n+1) in step S1131. The MS stores the value (n+1) as a temporary variable $temp_{GST}$ in step S1132 and calculates the number of bits to represent (n+1) in step S1133. For example, if a connection for rtPS is added to connections that the MS maintains for BE and nrtPS, the number of bits to represent uplink grant scheduling types is 2 ($2+1=3<2^2$).

Figure 12:
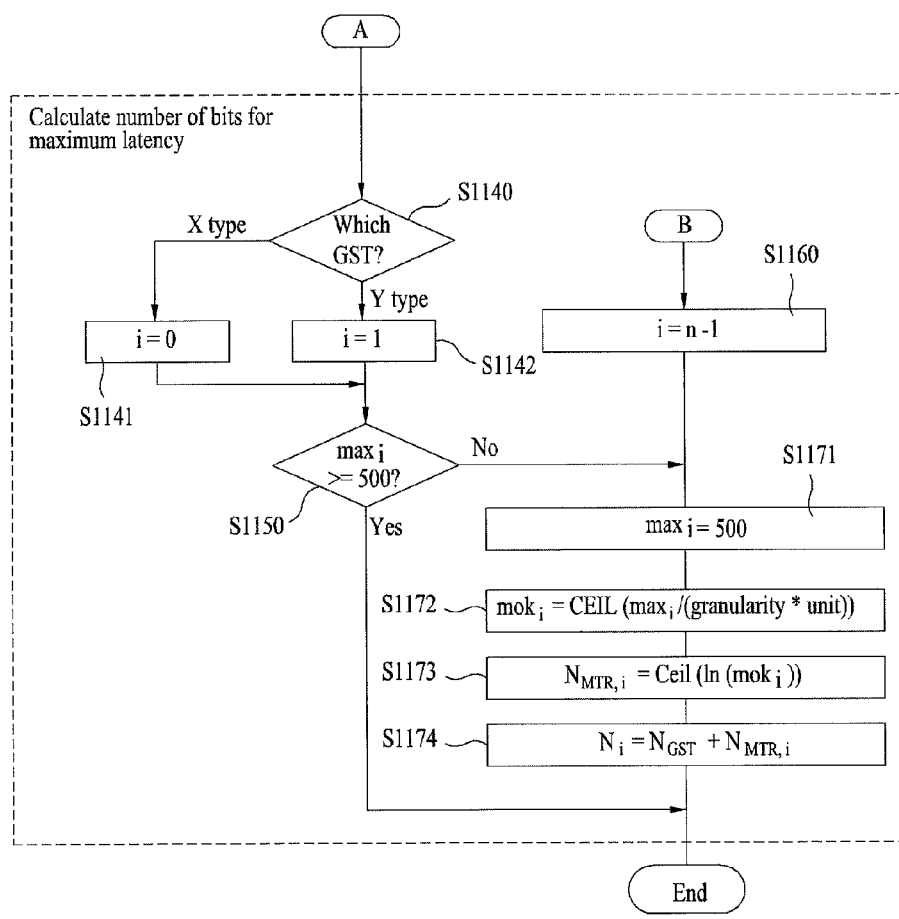
FIG. 12 is a flowchart illustrating an operation for calculating the number of bits required for Maximum latency being an element of the QoS level field.

FIG. 12 is a flowchart illustrating an operation for calculating Maximum latency being an element of the QoS level field, illustrated in FIG. 10.

Granularity information about Maximum latency is transmitted to the MS by a DSA-RSP message, as in FIG. 11. That is, the granularity of Maximum latency for each UL grant scheduling type may be notified to the MS. The final number of bits for the QoS level field may depend on a requested UL grant scheduling type and the granularity of a maximum latency.

In the case where the number of bits to represent the value (n+1) due to the new uplink grant scheduling type in FIG. 11 (Case B), an index i is set to (n−1) in step S1160.

A maximum latency for the index i, $max_i$ is notified to the MS by the DSA-RSP message in FIG. 11 in step S1171.

The maximum latency is divided by a granularity unit value (2×100) received by the DSA-RSP message in step S1172 and the number of bits is calculated to express the resulting value in step S1173. That is, the number of bits required to represent the value resulting from dividing the maximum latency given for the same uplink grant scheduling type by the granularity unit is calculated.

Thus, the number of bits to represent the QoS level field, $N_i$ may be calculated by summing the number $N_{GST}$ of bits for UL grant scheduling type and the number $N_{MTR,i}$ of bits for Maximum latency, $max_i$ in step S1174. In the illustrated case of FIG. 12, $N_{GST}$ is 2 and $N_{MTR,i}$ is 2. Hence, $N_i$ is 4. That is, the QoS level field occupies 4 bits in the case illustrated in FIG. 12. Obviously, Priority may be added to the QoS level field.

On the other hand, if UL grant scheduling type does not indicate a new uplink grant scheduling type (Case A) in FIG. 11, the index i is set to an integer equal to or less than (n−2), such as 0 or 1 in steps S1140, S1141 and S1142.

If the maximum latency max$_i$ is less than a value (e.g. 500) set in the DSA-RSP message, the MS calculates the number of bits for the QoS level field in steps S1171 to S1174. Otherwise, the MS ends the procedure.

The number of bits for the QoS level field may be updated, when a new uplink grant scheduling type is added or a maximum value of a specific parameter under the same uplink grant scheduling type is changed.

A BR header may be transmitted in a pre-allocated resource area or in a new resource area allocated by random access. As described above, the BR header may have a different format and a different length (or size) for a different BR type. Therefore, the MS may notify the length of a BR to be transmitted during the random access.

In the mean time, the procedures described in FIGS. 11 and 12 may not be performed, if a QoS level is indicated by a QoS index, not by a QoS level field.

FIG. 13 illustrates a method for indicating the length of a BR according to another exemplary embodiment of the present invention.

Referring to FIG. 13, the BS classifies codes used for random access according to header sizes and notifies MSs of mapping between the random access codes and the header types in step S1310. Herein, a plurality of random access codes may be grouped into one or more groups according to header types that are determined by header sizes.

The MS may determine a BR type according to the size of a requested uplink bandwidth. In step S1320, the MS may determine a header type according to a header length corresponding to the determined BR type.

The MS selects one code from a code group corresponding to the determined header type in steps S1321 and S1322.

For example, if the header length for the uplink bandwidth requested by the MS corresponds to Header type 1 in FIG. 13, the MS may select one of codes corresponding to Header type 1, herein a 5$^{th}$ code.

The MS transmits the selected code to the BS in step S1330 and receives an allocation message that permits transmission of the header type in step S1340.

Finally, the MS transmits a BR message according to the header type (or BR type) to the BS in step S1350.

In FIG. 13, two format lengths, 3 bytes and 4 bytes are defined for BR types and thus codes are also divided into two groups. The number of codes in each of the code groups may be notified to the MS by a broadcast message (UCD, sub-UCD, HRG, MRG, or LRG) or on a broadcast control channel (SBCH, PBCH, S-SFH, or P-SFH). Or the number of codes in each of the code groups may be preliminarily stored in the MS.

It may be contemplated as another method for notifying the BS of the length of a BR to be transmitted that a spread value of a header length indication is multiplied by a selected random access code prior to transmission, as in CDMA.

Mode for Invention

Various embodiments have been described in the best mode for carrying out the invention.

INDUSTRIAL APPLICABILITY

The present invention provides a bandwidth requesting method for reducing BR overhead by more efficiently designing the format of a BR header or a BR subheader. The present invention is applicable to an apparatus such as a BS, an MS, etc. in a system like an IEEE 802.16m system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for requesting a bandwidth by a mobile station, the method comprising:

acquiring, by the mobile station, index parameter information related to a bandwidth request for requesting uplink bandwidth from a communication with a base station, wherein the index parameter information is determined by considering a QoS parameter and is related to a size of the bandwidth request;

transmitting a bandwidth request code to the base station;

receiving an uplink resource allocation according to the index parameter information from the base station;

transmitting the bandwidth request having the size corresponding to the index parameter information;

transmitting a dynamic service change request (DSC-REQ) message including at least one changed QoS parameter of a new service flow to the base station, after the new service flow has been created; and receiving a dynamic service change response (DSC-RSP) message including new index parameter information from the base station in response to the DSC-REQ message, wherein the new index parameter information includes at least one new index determined by considering the at least one changed QoS parameter.

2. The method according to claim 1, wherein the QoS parameter comprises a grant scheduling type, a maximum latency, a minimum reserved traffic rate, and a priority.

3. A mobile station for requesting a bandwidth in a broadband wireless access system, the mobile station comprising:

a processor;

a transmission module configured to transmit a radio signal externally under the control of the processor; and a reception module configured to receive a radio signal externally under the control of the processor, wherein the processor acquires index parameter information related to a bandwidth request for requesting uplink bandwidth from a communication with a base station through the transmission module and the reception module, wherein the index parameter information is determined by considering a QoS parameter and is related to a size of the bandwidth request, and the processor controls the transmission module to transmit a bandwidth request code to the base station and to transmit the bandwidth request having the size corresponding to the index parameter information when an uplink resource allocation according to the index parameter information is received from the base station, wherein the processor further controls a dynamic service change request (DSC-REQ) message including at least one changed QoS parameter of a new service flow to be transmitted to the base station via the transmission module after creating the new service flow, and controls a dynamic service change response (DSC-RSP) message including new index parameter information to be received from the base station in response to the DSC-REQ message, and wherein the new index parameter information includes at least one new index determined by considering the at least one changed QoS parameter.

4. The mobile station according to claim 3, wherein the QoS parameter comprises a grant scheduling type, a maximum latency, a minimum reserved traffic rate, and a priority.

* * * * *